United States Patent
Ikeuchi et al.

(10) Patent No.: US 11,289,706 B2
(45) Date of Patent: Mar. 29, 2022

(54) LITHIUM ION SECONDARY BATTERY AND ELECTRIC DEVICE USING SAME

(71) Applicants: NATIONAL INSTITUTE OF ADVANCED INDUSTRIAL SCIENCE AND TECHNOLOGY, Tokyo (JP); SUMITOMO SEIKA CHEMICALS CO., LTD., Hyogo (JP)

(72) Inventors: Yuta Ikeuchi, Ikeda (JP); Taichi Sakamoto, Ikeda (JP); Takashi Mukai, Ikeda (JP); Masahiro Yanagida, Ikeda (JP); Junichi Fujishige, Kako-gun (JP); Masako Kinno, Kako-gun (JP); Erina Takahashi, Kako-gun (JP)

(73) Assignees: NATIONAL INSTITUTE OF ADVANCED INDUSTRIAL SCIENCE AND TECHNOLOGY, Tokyo (JP); SUMITOMO SEIKA CHEMICALS CO., LTD., Hyogo (JP)

( * ) Notice: Subject to any disclaimer, the term of this patent is extended or adjusted under 35 U.S.C. 154(b) by 357 days.

(21) Appl. No.: 16/341,314

(22) PCT Filed: Oct. 11, 2017

(86) PCT No.: PCT/JP2017/036813
§ 371 (c)(1),
(2) Date: Apr. 11, 2019

(87) PCT Pub. No.: WO2018/070423
PCT Pub. Date: Apr. 19, 2018

(65) Prior Publication Data
US 2021/0288326 A1    Sep. 16, 2021

(30) Foreign Application Priority Data

Oct. 13, 2016 (JP) .............................. JP2016-202094

(51) Int. Cl.
*H01M 4/62*   (2006.01)
*H01M 50/414*   (2021.01)
*H01M 50/446*   (2021.01)
*H01M 10/0525*   (2010.01)
*H01M 10/0567*   (2010.01)
*H01M 4/02*   (2006.01)

(52) U.S. Cl.
CPC ....... *H01M 4/622* (2013.01); *H01M 10/0525* (2013.01); *H01M 10/0567* (2013.01); *H01M 50/414* (2021.01); *H01M 50/446* (2021.01); *H01M 2004/021* (2013.01); *H01M 2220/30* (2013.01); *H01M 2300/0025* (2013.01)

(58) Field of Classification Search
CPC .. H01M 4/622; H01M 50/414; H01M 50/446; H01M 10/0525; H01M 10/0567
USPC ........................................................ 429/217
See application file for complete search history.

(56) References Cited

U.S. PATENT DOCUMENTS

| | | |
|---|---|---|
| 2009/0136845 A1 | 5/2009 | Choi et al. |
| 2011/0111280 A1 | 5/2011 | Tamakoshi et al. |
| 2011/0262796 A1 | 10/2011 | Shimooka et al. |
| 2014/0045054 A1 | 2/2014 | Komaba et al. |
| 2015/0280237 A1 | 10/2015 | Mukai et al. |
| 2016/0099452 A1 | 4/2016 | Takagi et al. |
| 2016/0156024 A1 | 6/2016 | Kinpara et al. |
| 2016/0365559 A1 | 12/2016 | Yoshimaru et al. |
| 2017/0025230 A1 | 1/2017 | Kinpara et al. |

FOREIGN PATENT DOCUMENTS

| | | |
|---|---|---|
| CN | 102077404 A | 5/2011 |
| JP | 10-334916 A | 12/1998 |
| JP | 2003-282063 A | 10/2003 |
| JP | 2006-156228 A | 6/2006 |
| JP | 2006-351365 A | 12/2006 |
| JP | 2007-048744 A | 2/2007 |
| JP | 2008-146862 A | 6/2008 |
| JP | 2009-135103 A | 6/2009 |
| JP | 2010-165565 A | 7/2010 |
| JP | 2013-139652 A | 7/2013 |
| JP | 2015-201267 A | 11/2015 |

(Continued)

OTHER PUBLICATIONS

Communication dated May 7, 2020, from the European Patent Office in application No. 17860387.4.
Takashi Mukai, et al., "Development of Lithium-Ion Battery Active Material and Techniques for Electrode Materials", Part III, Chapter 1, Section 1 (Problems of Existing 4 V Lithium-Ion Batteries), pp. 270-271, Science & Technology Co., Ltd., 2014, 1, ISBN: 978-4-86428-089-1.
Takashi Mukai and Tetsuo Sakai, "Development of Nonwoven Fabric Separator for Lithium-Ion Batteries", pp. 49-54 (2013), ISSN: 0288-5867.

(Continued)

*Primary Examiner* — Sean P Cullen
(74) *Attorney, Agent, or Firm* — Sughrue Mion, PLLC

(57) ABSTRACT

A lithium ion secondary battery includes a positive electrode having a positive electrode active material layer on a current collector, a negative electrode having a negative electrode active material layer on a current collector, and a separator disposed between the positive electrode and the negative electrode and impregnated with a non-aqueous electrolyte solution. The positive electrode active material layer contains a positive electrode active material and a binder, the negative electrode active material layer contains a negative electrode active material and a binder, the binder of the negative electrode active material layer contains a copolymer of vinyl alcohol and an alkali metal neutralized product of ethylenically unsaturated carboxylic acid, and the separator includes a polymeric base material containing an inorganic compound or includes a polymer having a melting point or glass transition temperature of 140° C. or higher.

12 Claims, No Drawings

(56) References Cited

FOREIGN PATENT DOCUMENTS

| KR | 20120000708 A | * | 1/2012 |
| WO | 2012/133034 A1 | | 10/2012 |
| WO | 2014/057627 A1 | | 4/2014 |
| WO | 2014/207967 A1 | | 12/2014 |
| WO | 2015151440 A1 | | 10/2015 |
| WO | 2016/056289 A1 | | 4/2016 |

OTHER PUBLICATIONS

International Search Report of PCT/JP2017/036813 dated Jan. 9, 2018 [PCT/ISA/210].
Office Action dated Dec. 21, 2021 from the Chinese Patent Office in Chinese Application No. 201780062372.9.

* cited by examiner

LITHIUM ION SECONDARY BATTERY AND ELECTRIC DEVICE USING SAME

CROSS REFERENCE TO RELATED APPLICATIONS

This application is a National Stage of International Application No. PCT/JP2017/036813 filed Oct. 11, 2017, claiming priority to Japanese Patent Application No. 2016-202094 filed Oct. 13, 2016.

TECHNICAL FIELD

The present invention relates to a lithium ion secondary battery and an electrical appliance using the battery.

BACKGROUND ART

Along with the current prevalence of notebook computers, smartphones, portable game devices, and portable electronic devices, such as personal digital assistants, downsizing and a higher energy density have been required for secondary batteries used as their power source, to reduce the weight of these devices and enable the use thereof for a long period of time.

In recent years, in particular, secondary batteries have been increasingly used as the power source for vehicles, such as electric cars and electric motorcycles. Such secondary batteries that are also used as the power source for vehicles are required to not only achieve a higher energy density, but also be able to be used in a wide temperature range.

Heretofore, secondary batteries were mainly nickel-cadmium batteries, nickel-hydrogen batteries, etc.; however, there has been an increasing trend to use lithium ion secondary batteries due to the above-mentioned demand for downsizing and a higher energy density.

As lithium ion secondary batteries have become prevalent, requests for safety have been increasing. There have recently been reports about accidents and defects regarding lithium ion batteries. Examples of such accidents include smoke emission from a battery loaded into an airplane, ignition of a battery pack used for electric cars, and the like. These accidents are considered to be caused by internal short circuit due to foreign matter contamination, exothermic reaction of positive electrode due to overcharge, or other reasons. Unlike lithium secondary batteries, which use metallic lithium, lithium ion secondary batteries hardly suffer from electrode short circuit caused by dendrite-like lithium deposition. However, lithium ion secondary batteries may possibly be deteriorated when overcharged or overdischarged. In particular, once an internal short circuit occurs, thermal runaway can cause ignition. Further, the presence of chemically highly active lithium, combustible electrolyte solutions, etc., requires sufficient caution when handling.

In addition to dropping of a heavy load on a battery, and addition of oscillation to a battery, methods for testing whether a battery generates heat due to mechanical factors include a method comprising causing an internal short circuit by allowing a nail ($\varphi$ 4.8 mm) to penetrate a non-aqueous secondary battery in a charged state, assuming the most severe condition (SBA standard, assuming a misuse such that when a battery is packed into a wooden box or the like, a nail accidentally penetrates the battery). Existing lithium ion secondary batteries will be short-circuited when a nail penetrates, causing a large electric current to flow into the nail, and the temperature to rapidly increase. When the temperature increases to 150° C. or higher, the polyolefin-based microporous membrane will be melted, resulting in a complete short circuit. When the temperature becomes even higher, and a complete short circuit occurs, the positive electrode material undergoes thermal decomposition and releases oxygen, which causes severe combustion of the organic solvent, highly possibly resulting in thermal runaway (Non-patent Literature (NPL) 1). Therefore, when, for example, a commercially available microporous membrane comprising an olefin-based resin, such as polyethylene and polypropylene, is used as a separator, melting (meltdown) may occur in a severe condition such that a nail penetrates, possibly causing thermal runaway of a battery (NPL 2).

As described above, lithium ion secondary batteries have a risk of generating heat. Since increasing the capacity enhances the risk, techniques for batteries that can simultaneously achieve both a high capacity and safety are in demand.

Regarding safety improvement, examples of methods for improving the safety of batteries in high temperatures include a method of improving temperature characteristics by modifying, with an organic substance, graphite used as a negative electrode (Patent Literature (PTL) 1); a method that uses positive electrode active materials having different exothermic onset temperatures (PTL 2); and the like. Further, examples of methods for improving safety against heat generation include a method of using an additive that inhibits the decomposition reaction of an electrolyte solution (PTL 3), a method of adding a film-forming compound to a positive electrode or an electrolyte (PTL 4), a method of sandwiching an insulating layer between electrodes (PTL 5), and the like.

CITATION LIST

Patent Literature

PTL 1: JPH10-334916A
PTL 2: JP2007-048744A
PTL 3: JP2003-282063A
PTL 4: JP2008-146862A
PTL 5: JP2010-165565A

Non-Patent Literature

NPL 1: Takashi MUKAI, et al., Development of Lithium Ion Battery Active Material and Techniques for Electrode Materials, Part III, Chapter 1, Section 1 (Problems of Existing 4 V Lithium Ion Batteries), pp. 270-271, Science & Technology Co., Ltd., 2014, 1, ISBN: 978-4-86428-089-1
NPL 2: Takashi MUKAI, Tetsuo SAKAI, High-Performance Paper Society, Japan, No. 52, Development of Nonwoven Fabric Separator for Lithium Ion Batteries, pp. 49-54 (2013), ISSN: 0288-5867

SUMMARY OF INVENTION

Technical Problem

However, the measures disclosed in PTL 1, PTL 2, PTL 3, PTL 4, and PTL 5 involve modification of the active material itself, addition of a compound that becomes an impurity, and the like, all of which can degrade battery performance. Thus, there has been demand for an improvement in safety against heat generation caused, in particular, by a short circuit etc., while maintaining high battery performance. Accordingly, an object of the present invention is to provide a lithium ion secondary battery in which heat generation is suppressed when the battery is internally short-circuited by an external impact, such as nail penetration or collapse, or short-circuited by foreign matter contamination etc.; and to provide an electrical appliance using this lithium ion secondary battery.

Solution to Problem

The present inventors conducted extensive research to solve the above problems, and consequently found that a lithium ion secondary battery in which a specific binder and a heat-resistant separator are used in combination can suppress thermal runaway caused by internal short circuit of the battery. The present invention has been completed as a result of further research. For example, the present invention encompasses the subject matter shown in the following items.

Item 1. A lithium ion secondary battery comprising
a positive electrode having a positive electrode active material layer on a current collector,
a negative electrode having a negative electrode active material layer on a current collector, and
a separator disposed between the positive electrode and the negative electrode and impregnated with a non-aqueous electrolyte solution,
the positive electrode active material layer comprising a positive electrode active material and a binder,
the negative electrode active material layer comprising a negative electrode active material and a binder,
the binder of the negative electrode active material layer comprising a copolymer of vinyl alcohol and an alkali metal neutralized product of ethylenically unsaturated carboxylic acid, and
the separator comprising a polymeric base material containing an inorganic compound (preferably a separator comprising a polymeric base material coated or filled with an inorganic compound), or comprising a polymer having a melting point or glass transition temperature of 140° C. or higher (preferably higher than 140° C.)

Item 2. The lithium ion secondary battery according to Item 1, wherein the binder of the positive electrode active material layer comprises a copolymer of vinyl alcohol and an alkali metal neutralized product of ethylenically unsaturated carboxylic acid (and preferably, the positive electrode active material layer and the negative electrode active material layer comprise the same copolymer of vinyl alcohol and an alkali metal neutralized product of ethylenically unsaturated carboxylic acid).

Item 3. The lithium ion secondary battery according to Item 1 or 2, wherein the binder of the negative electrode active material layer comprises a copolymer of vinyl alcohol and at least one alkali metal neutralized product of ethylenically unsaturated carboxylic acid selected from the group consisting of alkali metal neutralized products of acrylic acid and alkali metal neutralized products of methacrylic acid (and preferably, the binder of the positive electrode active material layer also comprises a copolymer of vinyl alcohol and at least one alkali metal neutralized product of ethylenically unsaturated carboxylic acid selected from the group consisting of alkali metal neutralized products of acrylic acid and alkali metal neutralized products of methacrylic acid).

Item 4. The lithium ion secondary battery according to any one of Items 1 to 3, wherein when the thickness of the negative electrode active material layer is defined as T µm, the amount of binder present in a region with a thickness of T/2 µm from the current collector side is 25 to 50 mass %, and the amount of binder present in a region with a thickness of T/2 µm from the negative electrode active material layer surface side (i.e., the side opposite to the current collector side) is 50 to 75 mass %, based on the total amount (100 mass %) of the binder contained in the negative electrode active material layer.

Item 5. The lithium ion secondary battery according to any one of Items 1 to 4, wherein the inorganic compound is at least one member selected from the group consisting of alumina, silica, zinc oxide, titanium oxide, aluminum nitride, silicon nitride, titanium nitride, boron nitride, aluminum sulfate, calcium sulfate, talc, bentonite, zeolite, kaolin, mica, montmorillonite, and glass.

Item 6. The lithium ion secondary battery according to any one of Items 1 to 5, wherein the polymeric base material is a base material of at least one polymer selected from the group consisting of polyethylene, polypropylene, polyamide, polyamideimide, polyimide, polyethylene terephthalate, and ethylene-propylene copolymers.

Item 7. The lithium ion secondary battery according to any one of Items 1 to 6, wherein the polymeric base material is in the form of a microporous membrane or a nonwoven fabric.

Item 8. The lithium ion secondary battery according to any one of Items 1 to 7, wherein the negative electrode active material layer has a thickness of 20 to 300 µm.

Item 9. The lithium ion secondary battery according to any one of Items 1 to 8, wherein the negative electrode active material layer comprises a conductive additive and has a binder content of 0.5 to 15 mass % and a conductive additive content of 5 mass % or less, based on the total amount (100 mass %) of the negative electrode active material, the binder, and the conductive additive contained in the layer.

Item 10. The lithium ion secondary battery according to any one of Items 1 to 9, wherein the positive electrode active material layer comprises a conductive additive and has a binder content of 0.5 to 30 mass % and a conductive additive content of 0.1 to 30 mass %, based on the total amount (100 mass %) of the positive electrode active material, the binder, and the conductive additive contained in the layer.

Item 11. The lithium ion secondary battery according to any one of Items 1 to 10, wherein the non-aqueous electrolyte solution comprises vinylene carbonate.

Item 12. The lithium ion secondary battery according to any one of Items 1 to 11, wherein the polymer of the separator comprising a polymer having a melting point or glass transition temperature of 140° C. or more (preferably higher than 140° C.) is at least one member selected from the group consisting of aramid, polyimide, polyamideimide, polysulfone, polyethersulfone, polyetherimide, polyphenylene ether (polyphenylene oxide), polybenzimidazole, polyarylate, polyacetal, polyphenylene sulfide, polyether ketones, polyester, polyethylene naphthalate, and ethylene-cycloolefin copolymers.

Item 13. An electronic device comprising the lithium ion secondary battery according to any one of claims 1 to 11.

Advantageous Effects of Invention

Unlike known batteries that would instantly generate heat when, for example, internally short-circuited by an external impact, such as nail penetration or collapse, or short-circuited by foreign matter contamination etc., the lithium ion secondary battery according to the present invention is capable of reducing instant heat generation even under such conditions. Therefore, the lithium ion secondary battery according to the present invention has improved safety compared to known batteries, and enables the simultaneous achievement of both a high capacity and safety; thus, applications can be expanded.

DESCRIPTION OF EMBODIMENTS

Embodiments of the lithium ion secondary battery and the electrical appliance using this battery according to the present invention are described below.

The lithium ion secondary battery comprises a positive electrode having a positive electrode active material layer, a negative electrode having a negative electrode active material layer, and a separator disposed between the positive electrode and the negative electrode and impregnated with a non-aqueous electrolyte solution (preferably, a sealed battery wherein a positive electrode and a negative electrode are laminated or wound through a separator). The positive electrode and the negative electrode each comprise a current collector and an active material (a negative electrode active material or a positive electrode active material) carried on the current collector using a binder. The negative electrode active material layer comprises, as a binder, a copolymer of vinyl alcohol and an alkali metal neutralized product of ethylenically unsaturated carboxylic acid. Further, the positive electrode active material layer may optionally comprise, as a binder, a known binder for lithium ion secondary battery electrodes (such as PVDF), or a copolymer of vinyl alcohol and an alkali metal neutralized product of ethylenically unsaturated carboxylic acid. The copolymer contained in the positive electrode may be the same as, or different from, the copolymer contained in the negative electrode.

The electrodes (negative electrode and positive electrode) are preferably, but not limited to, such that the active material is carried on one or both surfaces of a current collector (particularly a collector comprising a plate-shaped or foil-shaped material). In this case, each electrode has a two-layer structure comprising a current collector and an active material layer, or a structure in which a current collector is sandwiched between active material layers (a sandwich structure). The shape of the electrodes is also not particularly limited and can be selected from various shapes, including indefinite shapes, as long as the electrodes have the above structure. For example, a flat plate or winding (particularly cylindrical) shape is preferable.

In the present invention, the active material layer is laminated on the current collector. More specifically, the active material layer comprises an active material and a binder, and optionally further comprises a conductive additive. The laminate can be formed by applying a mixture comprising an active material and a binder, and optionally further comprising a conductive additive (an electrode mixture). The separator comprises a polymeric base material containing an inorganic compound, or comprises a polymer having a melting point or glass transition temperature of 140° C. or higher.

The lithium ion secondary battery having such a structure is not fully discharged instantaneously even when short-circuited, and a rise in battery temperature can be suppressed.

The internal short circuit due to a mechanical factor refers to a short circuit due to a contact of a positive electrode with a negative electrode by nail penetration, foreign matter contamination, collapse, etc. The contact referred to herein includes electrically contacting a positive electrode with a negative electrode via a nail, foreign matter, etc.

Each electrode material element is described in detail below.

Binder

A binder is used to bind active materials to each other, or bind an active material to a current collector. For example, an electrode mixture comprising an active material and a binder (when the mixture is in the form of a slurry, it is specifically called electrode slurry) is prepared, and the electrode mixture is applied to the current collector and dried to form an excellent active material layer.

Polyvinylidene difluoride (PVDF), styrene butadiene rubber (SBR), etc., are generally used as binders for producing lithium ion secondary battery electrodes. In the present invention, at least a copolymer of vinyl alcohol and an alkali metal neutralized product of ethylenically unsaturated carboxylic acid is used as a binder of the negative electrode. In the positive electrode, a known binder (PVDF) may be used, and a copolymer of vinyl alcohol and an alkali metal neutralized product of ethylenically unsaturated carboxylic acid can be preferably used. The binder of the present invention with which an active material of each electrode (a positive electrode and a negative electrode) is coated is considered to function as a material that prevents short circuit in the electrodes without deteriorating battery performance.

The copolymer of vinyl alcohol and an alkali metal neutralized product of ethylenically unsaturated carboxylic acid can be obtained, for example, by copolymerizing a vinyl ester and an ethylenically unsaturated carboxylic acid ester, and saponifying the resulting copolymer in a mixed solvent of an aqueous organic solvent and water in the presence of an alkali including an alkali metal. Specifically, vinyl alcohol itself cannot be used as a monomer as is because it is unstable. However, if a polymer obtained by using a vinyl ester as a monomer is saponified, the resulting polymer ends up with the same polymer as obtained by polymerizing vinyl alcohol as a monomer.

Examples of vinyl esters include vinyl acetate, vinyl propionate, vinyl pivalate, and the like. Vinyl acetate is preferable because the saponification reaction readily proceeds. Such vinyl esters may be used singly, or in a combination of two or more.

Examples of the ethylenically unsaturated carboxylic acid ester include methyl ester, ethyl ester, n-propyl ester, iso-propyl ester, n-butyl ester, and t-butyl ester of acrylic acid or methacrylic acid. Methyl acrylate and methyl methacrylate are preferable because the saponification reaction readily proceeds. Such ethylenically unsaturated carboxylic acid esters can be used singly, or in a combination of two or more.

If necessary, any other ethylenically unsaturated monomer copolymerizable with vinyl ester and ethylenically unsaturated carboxylic acid ester, or a crosslinking agent, can also be copolymerized. Further, copolymers other than this copolymer, such as ethylene-vinyl acetate copolymers (EVA) and styrene-butadiene copolymers (SBR), or polyvinyl alcohol (PVA), can also be used.

The saponification reaction in which a vinyl acetate-methyl acrylate copolymer is perfectly saponified with potassium hydroxide (KOH) is shown below as an example of the saponification reaction in this embodiment.

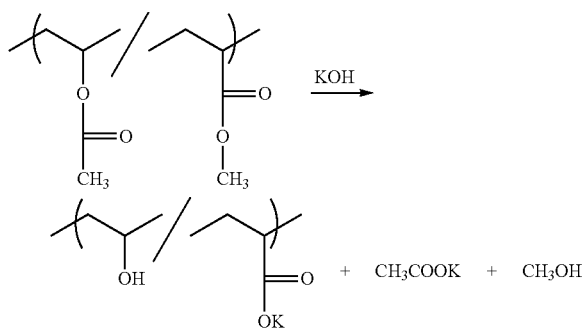

As described above, the copolymer of vinyl alcohol and an alkali metal neutralized product of ethylenically unsaturated carboxylic acid according to this embodiment is a material obtained by randomly copolymerizing a vinyl ester and an ethylenically unsaturated carboxylic acid ester, and saponifying a monomer-derived ester portion with the monomers being bound to each other by a C—C covalent bond (this product is hereinafter sometimes referred to as "a saponified copolymer of vinyl ester and ethylenically unsaturated carboxylic acid ester" or "a saponified vinyl ester-ethylenically unsaturated carboxylic acid ester copolymer"). The "-" in the vinyl ester-ethylenically unsaturated carboxylic acid ester means that a vinyl ester and an ethylenically unsaturated carboxylic acid ester are randomly copolymerized.

In the copolymer of vinyl ester and ethylenically unsaturated carboxylic acid ester according to this embodiment, the molar ratio of vinyl ester to ethylenically unsaturated carboxylic acid ester is preferably from 9:1 to 1:9, and more preferably from 8:2 to 2:8. When the molar ratio is outside the range of 9:1 to 1:9, the polymer obtained after saponification may be insufficient in terms of the binding persistence required of a binder.

Accordingly, in the obtained copolymer of vinyl alcohol and an alkali metal neutralized product of ethylenically unsaturated carboxylic acid, the copolymer composition ratio (vinyl alcohol:alkali metal neutralized product of ethylenically unsaturated carboxylic acid) is preferably a molar ratio in the range of 9:1 to 1:9, and more preferably 8:2 to 2:8.

The alkali metal neutralized product of ethylenically unsaturated carboxylic acid is preferably at least one member selected from the group consisting of alkali metal neutralized products of acrylic acid and alkali metal neutralized products of methacrylic acid. Examples of alkali metals of the alkali metal neutralized product of ethylenically unsaturated carboxylic acid include lithium, sodium, potassium, rubidium, cesium, and the like. Potassium and sodium are preferable. A particularly preferable alkali metal neutralized product of ethylenically unsaturated carboxylic acid is at least one member selected from the group consisting of neutralization products of sodium acrylate, potassium acrylate, sodium methacrylate, and potassium methacrylate.

In view of obtaining a copolymer in the form of powder, the vinyl ester-ethylenically unsaturated carboxylic acid ester copolymer, which is a precursor of the copolymer of vinyl alcohol and an alkali metal neutralized product of ethylenically unsaturated carboxylic acid, is preferably a copolymer obtained by a suspension polymerization method in which a monomer mainly composed of vinyl ester and ethylenically unsaturated carboxylic acid ester are polymerized into polymer particles while these monomers are suspended in an aqueous dispersant solution containing a polymerization catalyst.

Examples of the polymerization catalyst may include organic peroxides such as benzoyl peroxide and lauryl peroxide; and azo compounds such as azobisisobutyronitrile and azobisdimethylvaleronitrile. Lauryl peroxide is particularly preferable.

The amount of polymerization catalyst used is preferably 0.01 to 5% by mass, more preferably 0.05 to 3% by mass, and even more preferably 0.1 to 3% by mass, based on the total mass of the monomers. When the amount of polymerization catalyst is less than 0.01% by mass, the polymerization reaction may not be completed. When the amount of polymerization catalyst is more than 5% by mass, the final copolymer of vinyl alcohol and an alkali metal neutralized product of ethylenically unsaturated carboxylic acid may possibly have an insufficient binding effect.

The dispersant to be used for polymerization can be appropriately selected according to the types and amounts of monomers used, etc. Specific examples include water-soluble polymers such as polyvinyl alcohols (partially saponified polyvinyl alcohol and fully saponified polyvinyl alcohol), poly(meth)acrylic acid and salts thereof, polyvinylpyrrolidone, methylcellulose, carboxymethylcellulose, hydroxyethylcellulose, and hydroxypropylcellulose; water-insoluble inorganic compounds such as calcium phosphate and magnesium silicate. These dispersants can be used singly, or in a combination of two or more.

The amount of dispersant used is preferably from 0.01 to 10 mass %, and more preferably from 0.05 to 5 mass %, based on the total mass of the monomers; however, this may vary depending on the types of monomers used etc.

Further, water-soluble salts of alkali metals, alkali earth metals, etc., can be incorporated in order to adjust the surfactant effect of the dispersant. Examples include sodium chloride, potassium chloride, calcium chloride, lithium chloride, anhydrous sodium sulfate, potassium sulfate, disodium hydrogen phosphate, dipotassium hydrogen phosphate, trisodium phosphate, and tripotassium phosphate. These water-soluble salts may be used singly, or in a combination of two or more.

The amount of water-soluble salt used is usually from 0.01 to 10 mass %, based on the mass of the aqueous dispersant solution; however, this may vary depending on the type and amount of dispersant used etc.

The temperature at which the monomers are polymerized is preferably $-20°$ C. to $+20°$ C., and more preferably $-10°$ C. to $+10°$ C., relative to the 10-hour half-life temperature of the polymerization catalyst. For example, the 10-hour half-life temperature of lauryl peroxide is about $62°$ C.

When the temperature is lower than $-20°$ C. relative to the 10-hour half-life temperature, the polymerization reaction may possibly not be completed. When the temperature is higher than $+20°$ C., the copolymer of vinyl alcohol and an alkali metal neutralized product of ethylenically unsaturated carboxylic acid thus obtained may possibly have an insufficient binding effect.

The time of polymerizing the monomers is usually from a few hours to several tens of hours; however, this may vary depending on the type and amount of polymerization catalyst used, polymerization temperature, etc.

After the polymerization reaction is completed, the copolymer is separated by a process such as centrifugation or filtration, and is obtained in the form of a wet cake. The copolymer obtained in a wet cake form can be subjected to a saponification reaction either as is or after being dried, if necessary.

The number average molecular weight of the polymer referred to herein is a value determined by a molecular weight measuring device equipped with a GFC column (e.g., OHpak, manufactured by Shodex) using DMF as a solvent. Examples of such molecular weight measuring devices include 2695 and RI detector 2414, both manufactured by Waters Corporation.

The number average molecular weight of the copolymer before saponification is preferably 10,000 to 10,000,000, and more preferably 50,000 to 5,000,000. When the number average molecular weight before saponification is within the range of 10,000 to 10,000,000, the copolymer tends to have increased binding strength as a binder. This facilitates thick coating of an electrode mixture, even when the mixture is in the form of a slurry.

The saponification reaction can be performed, for example, in the presence of an alkali including alkali metal in an aqueous organic solvent alone, or in a mixed solvent of an aqueous organic solvent and water. Examples of alkalis including alkali metals that can be used in the saponification reaction include known alkalis. Alkali metal hydroxides are preferable, and sodium hydroxide and potassium hydroxide are particularly preferable in view of high reactivity.

The amount of alkali is preferably 60 to 140 mol %, and more preferably 80 to 120 mol %, based on the total number of moles of the monomers. When the amount of alkali is less than 60 mol %, saponification might be insufficient. Use of alkali in an amount of more than 140 mol % is not economical because the effect achieved is not further enhanced.

For the saponification reaction, either an aqueous organic solvent alone, or a mixed solvent of an aqueous organic solvent and water is preferable. Examples of the aqueous organic solvent include lower alcohols such as methanol, ethanol, n-propanol, isopropanol, n-butanol, and t-butanol; ketones such as acetone and methyl ethyl ketone; and mixtures of these substances. Among these aqueous organic solvents, lower alcohols are suitable, and methanol and ethanol are particularly preferable because the resulting copolymer of vinyl alcohol and an alkali metal neutralized product of ethylenically unsaturated carboxylic acid has an excellent binding effect and excellent resistance to mechanical shear.

The mass ratio of the aqueous organic solvent to water in the mixed solvent of an aqueous organic solvent and water (aqueous organic solvent:water) is preferably in the range of 2:8 to 10:0, and more preferably 3:7 to 8:2. When the mass ratio is outside the range of 2:8 to 10:0, the copolymer before or after saponification may have insufficient compatibility with the solvent, which possibly impedes sufficient progress of the saponification reaction. When the ratio of the aqueous organic solvent is less than 2:8, the binding strength of the binder decreases, and it also becomes difficult to industrially obtain a saponified vinyl ester-ethylenically unsaturated carboxylic acid ester copolymer because the viscosity is significantly increased during the saponification reaction.

The temperature at which the copolymer of vinyl ester and ethylenically unsaturated carboxylic acid ester is saponified is preferably 20 to 80° C., and more preferably 20 to 60° C.; however, this may vary depending on the molar ratio of the monomers. If the copolymer is saponified at a temperature of lower than 20° C., the saponification reaction may possibly not be completed. If the copolymer is saponified at a temperature of higher than 80° C., a side reaction, such as a molecular weight reduction due to an alkali, may possibly occur.

The saponification reaction time usually completes in about several hours; however, this may vary depending on the type and amount of alkali used, etc.

Upon completion of the saponification reaction, the saponified copolymer is usually in the form of a paste or slurry in a dispersed state. The obtained dispersion is separated into solid and liquid by a conventionally known method, such as centrifugation or filtration; and the obtained product is washed well with a lower alcohol, such as methanol. The resulting liquid-containing saponified copolymer is dried, whereby a saponified copolymer, which is a copolymer of vinyl alcohol and an alkali metal neutralized product of ethylenically unsaturated carboxylic acid, can be obtained in the form of spherical single particles or agglomerated particles formed by agglomeration of spherical particles.

After the saponification reaction, the saponified copolymer is acidized using an inorganic acid such as hydrochloric acid, sulfuric acid, phosphoric acid, or nitric acid, or an organic acid such as formic acid, acetic acid, oxalic acid, or citric acid. Thereafter, with use of an arbitrary alkali metal such as lithium hydroxide, sodium hydroxide, potassium hydroxide, rubidium hydroxide, cesium hydroxide, or francium hydroxide, different types of copolymers of vinyl alcohol and an alkali metal neutralized product of ethylenically unsaturated carboxylic acid (i.e., copolymers that differ in alkali metals) can also be obtained.

In general, the liquid-containing saponified copolymer is preferably dried under normal pressure or reduced pressure at a temperature of 30 to 120° C.

The drying time is usually from a few hours to several tens of hours; however, this may vary depending on the pressure and temperature during drying.

The volume average particle diameter of the copolymer of vinyl alcohol and an alkali metal neutralized product of ethylenically unsaturated carboxylic acid is preferably 1 µm or more and 200 µm or less, and more preferably 10 µm or more and 100 lam or less. If the volume average particle diameter is less than 1 µm, the binding effect is not sufficient. If the volume average particle diameter is more than 200 µm, the water-based thickener used might become non-uniform, and result in a low binding effect. The volume average particle diameter of the copolymer is a value measured using a laser diffraction particle size distribution analyzer (SALD-7100, manufactured by Shimadzu Corporation) equipped with a batch cell (SALD-BC, also manufactured by Shimadzu Corporation), and using 2-propanol or methanol as a dispersion solvent.

If the saponified copolymer obtained by drying the liquid-containing saponified copolymer has a volume average particle diameter of more than 200 µm, the volume average particle diameter can be adjusted to 1 µm or more and 200 µm or less by pulverizing the resulting saponified copolymer by a conventionally known pulverization method, such as mechanical milling.

Mechanical milling is a process in which an external force, such as shock, tension, friction, compression, or shear, is applied to the resulting saponified copolymer. Examples of devices used in this process include tumbling mills, vibration mills, planetary mills, rocking mills, horizontal mills, attritor mills, jet mills, grinding machines, homogenizers, fluidizers, paint shakers, mixers, and the like. For example, planetary mills pulverize or mix a saponified copolymer powder by mechanical energy generated by rotating and revolving a container containing the saponified copolymer and balls. This method is known to pulverize the powder to the nano-order.

The thickening effect of the copolymer of vinyl alcohol and an alkali metal neutralized product of ethylenically unsaturated carboxylic acid in the binder is preferably such that an aqueous solution containing 1 mass % of the copolymer of vinyl alcohol and an alkali metal neutralized product of ethylenically unsaturated carboxylic acid has a viscosity of 50 mPa·s to 10000 mPa·s, and more preferably 50 to 5000 mPa·s. If the viscosity is less than 50 mPa·s, the electrode mixture slurry thus obtained has an excessively low viscosity. As a result, the mixture might spread too fast to be applied easily onto the current collector, or the active material and conductive additive in the mixture might be insufficiently dispersed. If the viscosity is more than 10000 mPa·s, the electrode mixture may have excessively high viscosity, which makes it difficult to apply the mixture uniformly and thinly onto the current collector.

The viscosity of the 1 mass % aqueous copolymer solution is a value determined using a Brookfield rotational viscometer (model: DV–I+) with a No. 5 spindle rotor at 50 rpm (liquid temperature: 25° C.)

The copolymer of vinyl alcohol and an alkali metal neutralized product of ethylenically unsaturated carboxylic acid can function as a binder for lithium ion secondary battery electrodes with excellent binding strength and high binding persistence. While not wishing to be bounded by any particular theory, a possible reason for this may be that the copolymer of vinyl alcohol and an alkali metal neutralized product of ethylenically unsaturated carboxylic acid allows a current collector and an active material to bind tightly to each other; and also allows active material particles to bind tightly to each other to exhibit binding persistence high enough to reduce the possibility of peeling of the electrode mixture from the current collector or detachment of the active material, both arising from changes in the volume of the active material due to repeated charging and discharging, thereby substantially preventing the capacity of the active material from decreasing.

The binder for the lithium ion secondary battery electrode of this embodiment may further contain another water-based binder or the like that is different from the copolymer of vinyl alcohol and an alkali metal neutralized product of ethylenically unsaturated carboxylic acid. In this case, the amount of such an additional water-based binder or the like is preferably less than 80 mass %, based on the total mass of the copolymer of vinyl alcohol and an alkali metal neutralized product of ethylenically unsaturated carboxylic acid and the additional water-based binder or the like. More specifically, the content of the copolymer of vinyl alcohol and an alkali metal neutralized product of ethylenically unsaturated carboxylic acid in the binder is preferably 20 mass % or more and 100 mass % or less.

Examples of materials for the additional water-based binder or the like include carboxymethyl cellulose (CMC), acrylic resins, sodium polyacrylate, sodium alginate, polyimide (PI), polyamide, polyamideimide, polyacryl, styrene-butadiene-rubber (SBR), polyvinyl alcohol (PVA), ethylene-vinyl acetate (EVA) copolymers, and the like. These materials can be used singly, or in a combination of two or more.

Among the materials for the additional water-based binder, acrylic resins, sodium polyacrylate, sodium alginate, polyamide, polyamideimide, and polyimide are preferable, and acrylic resins are particularly preferable.

Positive Electrode Active Material

Positive electrode active materials used in the technical field to which the present invention pertains can be used as the positive electrode active material. Examples of preferable positive electrode active materials include lithium iron phosphate ($LiFePO_4$), lithium manganese phosphate ($LiMnPO_4$), lithium cobalt phosphate ($LiCoPO_4$), iron pyrophosphate ($Li_2FeP_2O_7$), lithium cobaltate composite oxide ($LiCoO_2$), spinel-type lithium manganese composite oxide ($LiMn_2O_4$), lithium manganese composite oxide ($LiMnO_2$), lithium nickel composite oxide ($LiNiO_2$), lithium niobium composite oxide ($LiNbO_2$), lithium iron composite oxide ($LiFeO_2$), lithium magnesium composite oxide ($LiMgO_2$), lithium calcium composite oxide ($LiCaO_2$), lithium copper composite oxide ($LiCuO_2$), lithium zinc composite oxide ($LiZnO_2$), lithium molybdenum composite oxide ($LiMoO_2$), lithium tantalum composite oxide ($LiTaO_2$), lithium tungsten composite oxide ($LiWO_2$), lithium-nickel-cobalt-aluminum composite oxide ($LiNi_{0.8}Co_{0.15}Al_{0.05}O_2$), lithium-nickel-cobalt-manganese composite oxide ($LiNi_xCo_yMn_{1-x-y}O_2$, wherein $0<x<1$, $0<y<1$, and $x+y<1$), Li-rich nickel-cobalt-manganese composite oxide, nickel manganese oxide ($LiNi_{0.5}Mn_{1.5}O_4$), manganese oxide ($MnO_2$), vanadium-based oxides, sulfur-based oxides, silicate-based oxides, and the like. These materials can be used alone, or in a combination of two or more.

Negative Electrode Active Material

The negative electrode active material can be any material that is capable of occluding and releasing lithium ions. Examples include at least one element selected from the group consisting of Li, Na, C (such as graphite), Mg, Al, Si, P, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb, and Bi; alloys, oxides, chalcogenides, or halides of these elements; and the like. Such materials can be used in the form of a single element, an alloy, a compound, or a solid solution. Negative electrode active materials can be used singly, or in a combination of two or more.

Among these materials, C is preferable because the discharge plateau region is observed within a range of 0 to 1 V (against the lithium potential), and in view of cycle life characteristics. Examples of C include carbon materials, such as graphite, hard carbon, and soft carbon.

The negative electrode active material can be a mixture or a composite of such a carbon material with other material(s) capable of reversibly occluding and releasing lithium. More specifically, when using a composite active material comprising a graphite-Si composite as a silicon-containing material and a hard carbon-Sn composite as a tin-containing material, the effect of this embodiment can be more preferably provided.

Conductive Additive

As long as the conductive additive has electronic conductivity, the conductive additive is not particularly limited. Carbon powder is preferable. Examples of carbon powder include carbon materials such as acetylene black (AB), Ketjen black (KB), graphite, carbon fibers, carbon tubes, graphene, amorphous carbon, hard carbon, soft carbon, glassy carbon, carbon nanofibers, and carbon nanotubes (CNT). These materials can be used singly, or in a combination of two or more. From the viewpoint of enhancing conductivity, carbon nanofibers and carbon nanotubes are preferable, and carbon nanotubes are more preferable among these. When carbon nanotubes are used as a conductive additive, the content of carbon nanotubes is preferably, for example, but not limited to, 30 mass % to 100 mass %, and more preferably 40 mass % to 100 mass %, based on the total mass of the conductive additive. A carbon nanotube content of less than 30 mass % is not preferable because a sufficient conductive path between an electrode active material and a current collector is not ensured; and, particularly in high-speed charge/discharge, a sufficient conductive path may possibly not be formed. "Carbon nanofibers" refer to fibrous materials having a thickness of several nanometers to several hundreds of nanometers. Of these materials, materials having a hollow structure are specifically called "carbon nanotubes." There are various types of nanotubes, such as single-layer carbon nanotubes and multilayer carbon nanotubes. These materials can be produced by various methods; these methods include, but are not limited to, vapor phase epitaxy, arc discharge, laser evaporation, and like methods.

Auxiliary Dispersant

The electrode mixture may further comprise an auxiliary dispersant, if necessary. The presence of the auxiliary dispersant preferably enhance the dispersibility of the active material and the conductive additive in the mixture. The auxiliary dispersant is preferably an organic acid that is soluble in an aqueous solution at pH 7 or higher and pH 13 or lower, and has a molecular weight of 100,000 or less. Among such organic acids, those containing carboxyl and at least one of hydroxyl, amino, and imino groups are preferable. Specific examples include, but are not limited to, compounds that contain carboxyl and hydroxyl groups, such as lactic acid, tartaric acid, citric acid, malic acid, glycolic acid, tartronic acid, glucuronic acid, and humic acid; compounds that contain carboxyl and amino groups, such as glycine, alanine, phenylalanine, 4-aminobutyric acid, leucine, isoleucine, lysine; compounds that contain more than one carboxyl and amino groups, such as glutamic acid and aspartic acid; compounds that contain carboxyl and imino groups, such as proline, 3-hydroxyproline, 4-hydroxyproline, and pipecolic acid; compounds that contain carboxyl and a functional group other than hydroxyl and amino, such as glutamine, asparagine, cysteine, histidine, and tryptophan; and the like. Among these, from the viewpoint of ease of availability, glucuronic acid, humic acid, glycine, aspartic acid, and glutamic acid are preferable.

Since the water-dispersible slurry for lithium ion secondary battery electrodes may possibly have a pH of 7 or higher due to the influence of active material-derived lithium hydroxide, binder-derived alkali component, etc., it is important for the auxiliary dispersant to have the property of being dissolved in an aqueous solution at pH 7 or higher.

The auxiliary dispersant preferably has a molecular weight of 100,000 or less from the viewpoint of being soluble in water. When the molecular weight is more than 100,000, the molecule is more hydrophobic, which may possibly deteriorate the uniformity of the slurry.

Electrodes

Electrodes can be produced by a technique used in the technical field to which the present invention pertains. For example, each electrode can be produced by providing an electrode mixture on a current collector. More specifically, for example, the electrode mixture is applied to a current collector (and dried, if necessary) to thereby form an electrode. Alternatively, a coating film of the electrode mixture can be tightly adhered to the current collector by using a press (e.g., a roller press). In this case, the electrode can be considered to have the electrode mixture layer (a layer comprising the electrode mixture) on the current collector. Electrodes are members for converting chemical energy to electric energy. Upon charging and discharging, an oxidation reaction or a reduction reaction of the active material in each electrode occurs. The negative electrode is an electrode that occludes lithium ions or is lithiated during charging, and that releases lithium ions or is delithiated during discharging. The positive electrode is an electrode that releases lithium ions or is delithiated during charging, and that occludes lithium or is lithiated during discharging.

Current Collector

The current collector of the negative electrode is not particularly limited, as long as it is made of a material that has electronic conductivity and that allows electric current to pass through the negative electrode material retained on the current collector. Examples of materials for the current collector include conductive substances, such as C, Cu, Ni, Fe, V, Nb, Ti, Cr, Mo, Ru, Rh, Ta, W, Os, Ir, Pt, Au, and Al; and alloys each containing two or more of these conductive substances (e.g., stainless steel). Other examples of usable materials include conductive substances plated with a different conductive substance (e.g., Fe plated with Cu). From the viewpoint of high electrical conductivity and excellent stability and high oxidation resistance in an electrolyte solution, the material for the current collector is preferably C, Ni, stainless steel, etc. Cu and Ni are more preferable from the viewpoint of material cost.

The current collector of the positive electrode is not particularly limited, as long as it is made of a material that has electronic conductivity and that allows electric current to pass through the positive electrode material retained on the current collector. Examples of usable materials for the current collector include conductive substances, such as C, Ti, Cr, Mo, Ru, Rh, Ta, W, Os, Ir, Pt, Au, and Al; and alloys each containing two or more of these conductive substances (e.g., stainless steel). From the viewpoint of high electrical conductivity, and excellent stability and high oxidation resistance in an electrolyte solution, the material for the current collector is preferably C, Al, stainless steel, etc. Al is more preferable from the viewpoint of material cost.

The current collector is preferably, but not limited to, a collector in the form of a plate or foil. For example, a plate or a foil comprising a material as mentioned above can be preferably used.

Negative Electrode

The negative electrode can be obtained, for example, by applying a mixture of a negative electrode active material, a binder, and water, optionally with a conductive additive and/or an auxiliary dispersant (a negative electrode mixture), and preferably a slurry thereof (a negative electrode slurry), to a current collector; and performing temporary drying, and then heat treatment.

When the slurry is produced, the binder can be dissolved in water beforehand, and then used. Alternatively, after an active material, a conductive additive, a binder, and an auxiliary dispersant in the form of powder are mixed beforehand, water can be added, and the binder can be mixed.

The water is used as a medium in which a binder is dissolved, and an active material and a conductive additive are dispersed. To enhance the dispersibility of the active material and conductive additive, the slurry preferably comprises an auxiliary dispersant.

The solids content (the negative electrode active material and the binder, and optionally a conductive additive and an auxiliary dispersant) concentration of the slurry is not particularly limited. For example, based on 100 mass % of the total solids content of the slurry, the solids content concentration is preferably 20 mass % or more and 80 mass % or less, and preferably 30 mass % or more and 70 mass % or less. The slurry having a solids content concentration of these components within the above range is easy to handle, and cracking is less likely to occur on the active electrode material layer when the electrode is dried.

The method for drying the electrode is not particularly limited, as long as the solvent can be removed from the slurry by evaporation. For example, a method comprising performing heat treatment in atmospheric air at a temperature of 50 to 300° C. can be used. The drying method includes, for example, natural drying, hot-air drying, drying by heating, far-infrared radiation drying, and like methods; and any method can be used.

When the amount of binder distributed in the negative electrode active material layer is defined as 100 mass % and the distance from the current collector surface to the active surface layer is defined as T, the amount of binder in the region from the current collector surface to T/2 (a region near the current collector surface in the negative electrode active material layer) is preferably 25 to 50 mass %; and the amount of binder in the region from the active material layer surface to T/2 (a region near the active material current collector surface in the negative electrode active material layer) is preferably 50 to 75 mass %. In the negative electrode active material layer, when the amount of binder in the region from the current collector surface to T/2 is 25 mass % or more, the active material layer tends to be particularly prevented from being peeled off from the current collector. When the amount of binder is 50 mass % or less, the electronic conductivity of the electrode surface is particularly low, and large heat generation is less likely to occur in the event of short circuit. More preferably, the amount of binder in the region from the current collector surface to T/2 is 30 to 50 mass %, and the amount of binder in the region from the active material layer surface to T/2 (a region near the active material current collector surface in the negative electrode active material layer) is 50 to 70 mass %.

Among such negative electrode active material layers, those having a binder concentration gradient structure are particularly preferable. Drying with hot air of 70° C. or more can provide a negative electrode having a binder concentration gradient such that the concentration in the cross-section of the negative electrode active material layer increases toward the active material layer surface from the current collector side (preferably continuously). A negative electrode having such a binder concentration gradient structure has lower electronic conductivity on the electrode surface, which advantageously reduces heat generation at the time of short circuit of a secondary battery.

The amount of binder distributed in the active electrode material layer is determined by a method using a field emission electron probe micro-analyzer (FE-EPMA).

The negative electrode active material layer preferably has a thickness of 20 to 300 μm. When the thickness is 20 μm or more, not only does the electrode capacitance density increase, but a temperature rise of the battery in the event of short circuit also tends to be particularly inhibited. A thickness of 300 μm or less does not provide a high electrical resistivity; and charging and discharging take little time, and a large volume change is less likely to occur. Therefore, preferable cycle life characteristics are obtained, and sufficient battery performance can be advantageously exhibited.

The conductive additive content is preferably 5 mass % or less (that is, more than 0 mass % and not more than 5 mass %), more preferably about 0.01 to 5 mass %, even more preferably about 0.1 to 4 mass %, and still even more preferably 0.5 to 3 mass %, based on the total mass of the active material, the conductive additive, and the binder. That is, the conductive additive may be added if necessary, and its amount is preferably 5% or less. When the conductive additive content is more than 5 mass %, the temperature of the battery tends to rise significantly in the event of short circuit of the battery. Further, the conductive additive content of more than 5 mass % is less preferred for the following reasons: high capacitance is difficult to attain at the time of charging and discharging of a battery due to a relatively low proportion of the active material; because carbon repels water and is thus difficult to be uniformly dispersed, the active material aggregates; because the conductive additive is smaller in size than the active material, a larger content of the conductive additive increases the total surface area of the active material and conductive additive, thus increasing the amount of binder used.

The binder content is preferably, for example, but not limited to, 0.5 mass % or more and 15 mass % or less, more preferably 1 mass % or more and 10 mass % or less, and even more preferably 1.5 mass % or more and 5 mass % or less, based on the total mass of the negative electrode active material, the conductive additive, and the binder. An excessively large amount of binder causes an excessively high impedance of the electrode, which tends to deteriorate input-output characteristics. Further, because the proportion of the active material is relatively decreased, it is difficult to attain a high capacitance during charging and discharging of the battery. On the other hand, when the amount of binder is excessively small, high electronic conductivity of the electrode is achieved; however, heat tends to be generated rapidly in the event of short circuit. Further, cycle life characteristics due to insufficient binding strength and aggregation due to insufficient viscosity of slurry tend to easily occur.

When the auxiliary dispersant content is 0.01 mass % or more, based on the total mass of the negative electrode active material, the binder, and the conductive additive, the active material can be efficiently and effectively micro-dispersed in the preparation of an active material dispersion. To maintain the micro-dispersibility and dispersion stability, an auxiliary dispersant content of 5.0 mass % or less is sufficient.

Positive Electrode

The positive electrode can be obtained, for example, by coating a current collector with a mixture of the positive electrode active material, the binder, and the solvent, optionally with a conductive additive and an auxiliary dispersant (a positive electrode mixture), preferably a slurry thereof (a positive electrode slurry); subjecting the mixture to temporal drying; and then performing heat treatment.

The binder can be any binder known to be used in the production of lithium ion secondary battery positive electrodes. For example, PVDF and PTFE are preferable from the viewpoint of oxidation resistance. A copolymer of vinyl alcohol and an alkali metal neutralized product of ethylenically unsaturated carboxylic acid can be preferably used. Water can be used as a medium for dissolving the binder and dispersing the active material and the conductive additive. From the viewpoint of resistance of the binder to swelling of the electrolyte solution, the binder is preferably a copolymer of vinyl alcohol and an alkali metal neutralized product of ethylenically unsaturated carboxylic acid.

The slurry can be produced, for example, in the same manner as in the production of slurry for the negative electrode.

The solids content (the positive electrode active material and the binder, and optionally a conductive additive and an auxiliary dispersant) concentration of the slurry is not particularly limited. For example, based on 100 mass % of the total solids content of the slurry, the solids content concentration is preferably 20 mass % or more and 80 mass % or less, and preferably 30 mass % or more and 70 mass % or less. The slurry having a solids content concentration of these components within the above range is easy to handle, and cracking is less likely to occur on the active electrode material layer when the electrode is dried.

The method for drying the electrode is not particularly limited, as long as the solvent can be removed from the slurry by evaporation. For example, a method comprising performing a heat treatment in the air at a temperature atmosphere of 50 to 300° C. can be used. The drying method includes natural drying, hot-air drying, far-infrared radiation drying, etc. Any method can be used, without issue.

Drying by far-infrared radiation can reduce the likelihood of a non-uniform binder concentration in the cross-section of the positive electrode active material layer. A concentration gradient of the binder in the positive electrode is not always necessary. The concentration gradient of the binder in the positive electrode hardly changes heat generation at the time of short circuit.

The content of the conductive additive is preferably about 0.1 to 30 mass %, more preferably about 0.5 to 20 mass %, and even more preferably 1 to 10 mass %, based on the total mass of the positive electrode active material, the conductive additive, and the binder. Specifically, the amount of conductive additive is preferably 30 mass % or less, and at least 0.1 mass % or more. A conductive additive content of more than 30 mass % is not preferable for the following reasons: high capacitance is difficult to attain at the time of charging and discharging of a battery due to a relatively low proportion of the active material; because carbon repels water and is thus difficult to be uniformly dispersed, the active material aggregates; because the conductive additive is smaller in size than the active material, the surface area becomes larger and an increased amount of binder is used. A conductive additive content of 0.1 mass % or more advantageously improves charging and discharging characteristics of the battery.

The content of the binder is preferably, for example, but not limited to, 0.5 mass % or more to 30 mass % or less, more preferably 1 mass % or more to 20 mass % or less, and even more preferably 1.5 mass % or more and 10 mass % or less, based on the total mass of the positive electrode active material, the conductive additive, and the binder. An excessively large amount of binder causes an excessively high impedance of the electrode, which tends to deteriorate input-output characteristics. Further, because the proportion of the active material is relatively decreased, a high capacitance is difficult to attain at the time of charging and discharging of the battery. On the other hand, when the amount of binder is excessively small, cycle life characteristics due to insufficient binding strength and aggregation due to insufficient viscosity of slurry tend to easily occur.

When the auxiliary dispersant content is 0.01 mass % or more, based on the total mass of the active material, the binder, and the conductive additive, the active material and the like can be finely dispersed efficiently and effectively at the time of preparing a dispersion of the active material. An auxiliary dispersant content of 5.0 mass % or less is sufficient for maintaining the fine dispersibility and dispersion stability.

Lithium Ion Secondary Battery

The electrode (positive electrode or negative electrode) thus obtained is bonded to its counter electrode (negative electrode or positive electrode) through a separator, and sealed in a state immersed in an electrolyte solution, thus forming a secondary battery.

Hereinafter, the element of the battery member is described in detail.

Separator

As described above, in order to reduce the amount of heat generation in the event of short circuit, a copolymer of vinyl alcohol and an alkali metal neutralized product of ethylenically unsaturated carboxylic acid is used as a binder for the negative electrode. Even with the use of this copolymer, there are cases where the temperature of the battery rises instantaneously at the time of short circuit. For example, when a microporous membrane comprising an olefin-based resin, such as commercially available polyethylene or polypropylene, is used as a separator, melting (meltdown) may occur under a severe condition such that a nail penetrates, possibly causing thermal runaway of a battery; however, such occurrences depend on the battery size. When a copolymer of vinyl alcohol and an alkali metal neutralized product of ethylenically unsaturated carboxylic acid is used as the binder for the negative electrode and when a separator comprising a polymeric base material containing an inorganic compound or comprising a polymer having a melting point or glass transition temperature of 140° C. or higher is used as the separator, heat generation in the event of short circuit of a secondary battery is preferably inhibited.

The separator preferably has heat resistance (i.e., is a heat-resistant separator) and is made of a material that can withstand the environment in which a lithium ion secondary battery is used. Specifically, a preferable separator does not melt even when allowed to stand at 140° C. for 10 minutes, more preferably at 160° C. for 10 minutes, and even more preferably at 180° C. for 10 minutes.

The separator used in the present invention is preferably a separator treated for heat resistance so as not to be completely melted. Among such separators, separators comprising a polymeric base material containing an inorganic compound (a polymeric base material coated with an inorganic compound, or a polymeric base material filled with an inorganic compound; a polymeric base material that is coated or filled with an inorganic compound) is preferable.

Examples of the inorganic compound include inorganic oxides. Among these, metal oxides are preferable. Other examples include metal nitrides, sulfates, clay minerals, glasses (preferably glass fibers), and the like. Examples of inorganic oxides (in particular, metal oxides) include alumina, silica, zinc oxide, titanium oxide, and the like. Examples of metal nitrides include aluminum nitride, silicon nitride, titanium nitride, boron nitride, and the like. Examples of sulfates include aluminum sulfate, calcium sulfate, and the like. Examples of clay minerals include talc, bentonite, zeolite, kaolin, mica, montmorillonite, and the like. Among these, inorganic oxides are preferable, and metal oxides are more preferable. These inorganic compounds can be used singly, or in a combination of two or more.

The separator used in the present invention can be produced by various methods. For example, a method comprising applying a solution containing an inorganic compound (preferably an inorganic filler) etc. to at least one side or both sides of the polymeric base material and drying can be used. In this case, the method for preparing the solution is not particularly limited as long as the solution characteristics and dispersibility required in the application step are maintained. For example, mechanical stirring using a ball mill, a bead mill, a homogenizer, a high-speed impact mill, ultrasonic dispersion, agitating blades, etc., can be used. The method for applying the solution is also not particularly limited. Examples include screen printing, spray coating, bar coating, gravure coating, and like methods. Considering the desired thickness and ease of handling of the solution, the optimal method is used for the application. Examples of the method for removing the solvent from the solution applied to the base material include drying by heating, solvent replacement, and like methods. The method is not particularly limited, as long as it does not deteriorate characteristics of the resulting separator.

The separator, may be, for example, in the form of a microporous membrane, woven cloth, non-woven cloth, or green compact. The separator in the form of a microporous membrane or non-woven fabric is particularly preferable from the viewpoint of output characteristics and high separator strength.

The base material of the separator is not particularly limited, as long as it is resistant to electrolyte solutions. The base material of the separator preferably comprises a heat-resistant polymeric base material that does not melt down by heat locally generated at the time of short circuit.

Examples of polymeric base materials of the separator include polyethylene (PE), polypropylene (PP), polyamide, polyamideimide, polyimide, polyethylene terephthalate (PET), ethylene-propylene copolymers (PE/PP), and like materials (resins).

Preferable examples of the separator used in the present invention include NanoBaseX comprising PET non-woven fabric coated with an inorganic oxide (produced by Mitsubishi Paper Mills, Ltd.); LIELSORT comprising a polyethylene base material coated with meta-aramid (produced by Teijin, Ltd.); Pervio comprising a combination of a polyolefin base material and an aramid heat-resistant layer; and the like.

Other preferable examples of the separator used in the present invention include separators comprising a polymer having a melting point or glass transition temperature of 140° C. or more (preferably higher than 140° C., more preferably 145° C. or more, and even more preferably 150° C. or more). Separators comprising a polymer having a melting point of 140° C. or more (preferably higher than 140° C., more preferably 145° C. or more, and even more preferably 150° C. or more) are particularly preferable.

Examples of polymers having a melting point or glass transition temperature of 140° C. or more (when polymers have both a melting point and a glass transition temperature, polymers having a melting point of 140° C. or more are preferable) include aramid, polyimide, polyamideimide, polysulfone, polyethersulfone, polyetherimide, polyphenylene ether (polyphenylene oxide), polybenzimidazole, polyarylate, polyacetal, polyphenylene sulfide, polyetherketone, polyester, polyethylene naphthalate, ethylene-cycloolefin copolymers, and the like. These polymers can be used singly, or in a combination of two or more.

Electrolyte Solution

The electrolyte of the lithium ion secondary battery of the present invention can be a solid electrolyte or an ionic liquid, and is preferably an electrolyte solution comprising a mixture of an electrolyte with a solvent.

Since the electrolyte must contain lithium ions, electrolyte salts thereof are preferably lithium salts; however, the electrolyte salts are not particularly limited as long as they are used in lithium secondary batteries. Examples of lithium salts that can be used include at least one salt selected from the group consisting of lithium hexafluorophosphate, lithium perchlorate, lithium tetrafluoroborate, lithium trifluoromethanesulfonate, and imide lithium trifluoromethanesulfonate.

Examples of the solvent of the electrolyte that can be used include at least one member selected from the group consisting of propylene carbonate (PC), ethylene carbonate (EC), dimethyl carbonate (DMC), diethyl carbonate (DEC), γ-butyrolactone, 2-methyltetrahydrofuran, 1,3-dioxolane, 4-methyl-1,3-dioxolane, 1,2-dimethoxyethane, 1,2-diethoxyethane, diethyl ether, sulfolane, methylsulfolane, nitromethane, N,N-dimethylformamide, and dimethyl sulfoxide. A mixture of ethylene carbonate and diethyl carbonate, propylene carbonate, or γ-butyrolactone is particularly preferable. The mixing ratio of ethylene carbonate and diethyl carbonate in the mixture can be freely adjusted within a range such that the amount of each of ethylene carbonate and diethyl carbonate falls within the range of 10 to 90 volume %.

The additive of the electrolyte solution preferably contains vinylene carbonate (VC). Containing VC can lower the amount of heat generated when short circuit occurs. The amount of VC in the electrolyte solution is preferably 0.1 to 5 mass %, more preferably 0.5 to 2 mass %, and even more preferably 0.75 to 1.5 mass %.

Electrical Appliance

The lithium ion secondary battery of the present invention is highly safe, and thus can be used as a power source of various electrical appliances (including vehicles using electricity).

Examples of electrical appliances include air conditioners, washing machines, televisions, refrigerators, personal computers, tablets, smartphones, personal computer keyboards, monitors, printers, mice, hard disks, personal computer peripherals, clothes irons, laundry dryers, transceivers, air blowers, music recorders, music players, ovens, microwave ovens, air heaters, car navigation systems, flashlights, humidifiers, portable karaoke systems, air cleaners, game machines, sphygmomanometers, coffee mills, coffee makers, kotatsu [small, blanket-covered tables with heaters], vibrator, copy machines, disk changers, radios, shavers, juicers, shredders, water purifiers, lighting devices, dish dryers, rice cookers, trouser presses, vacuum cleaners, weight scales, electrically heated carpets, electric pots, electronic dictionaries, electronic organizers, electromagnetic cookers, electric calculators, electric carts, electric wheelchairs, electric tools, electric toothbrushes, heating pads, clocks, intercoms, air circulators, electric shock insect killer, hot plates, toasters, water heaters, pulverizers, soldering irons, video cameras, video cassette recorders, facsimiles, futon dryers, mixers, sewing machines, rice cake makers, water cooler, electronic musical instruments, motorcycles, toys, lawn mowers, bicycles, automobiles, hybrid vehicles, plug-in hybrid vehicles, railroads, ships, airplanes, emergency storage batteries, and the like.

EXAMPLES

The present invention is described below with reference to Production Examples, Examples, and Comparative Examples. However, the present invention is not limited to these Examples. In these Examples, "part" and "%" are based on mass, unless otherwise specified. The evaluations in the Examples and Comparative Examples were performed under the following conditions.

Production of Binder

Production Example 1

Synthesis of Vinyl Ester-Ethylenically Unsaturated Carboxylic Acid Ester Copolymer Seven hundred and sixty-eight grams of water and 12 g of anhydrous sodium sulfate were placed in a 2-L reaction vessel equipped with a stirrer, a thermometer, an $N_2$ gas inlet tube, a reflux condenser, and a dropping funnel; and $N_2$ gas was blown into the vessel to remove oxygen from the system. Subsequently, 1 g of partially saponified polyvinyl alcohol (saponification degree: 88%) and 1 g of lauryl peroxide were added, followed by heating to an internal temperature of 60° C. Thereafter, 104 g (1.209 mol) of methyl acrylate and 155 g (1.802 mol) of vinyl acetate were added thereto dropwise through a dropping funnel over 4 hours. The internal temperature was then maintained at 65° C. for 2 hours for reaction to take place. Subsequently, the solids content was filtered off to obtain 288 g of a vinyl acetate-methyl acrylate copolymer (water content: 10.4%). The obtained polymer was dissolved in DMF and filtered through a membrane filter (produced by Advantec, pore size: 0.45 μm), and the molecular weight was measured using a molecular weight measurement apparatus (2695, produced by Waters, 2414 RI detector) containing a GFC column (OHpak, produced by Shodex); the number average molecular weight was found to be 188,000.

Production Example 2

Synthesis of Copolymer of Vinyl Alcohol and Alkali-Metal-Neutralized Ethylenically Unsaturated Carboxylic Acid Four hundred and fifty grams of methanol, 420 g of water, 132 g (3.3 mol) of sodium hydroxide, and 288 g of the copolymer obtained in Production Example 1 (water content: 10.4%) were placed in the same reaction vessel as in Production Example 1 and stirred at 30° C. for 3 hours, followed by a saponification reaction. After completion of the saponification reaction, the obtained saponified copolymer was washed with methanol, filtered, and dried at 70° C. for 6 hours, thereby obtaining 193 g of a saponified copolymer of vinyl acetate and methyl acrylate (copolymer of vinyl alcohol and sodium acrylate). The saponified copolymer of vinyl acetate and methyl acrylate (copolymer of vinyl alcohol and sodium acrylate) had a volume average particle diameter of 180 μm. The volume average particle diameter was measured using a laser diffraction particle size distribution analyzer (SALD-7100, produced by Shimadzu Corporation).

Production Example 3

Pulverization of Copolymer of Vinyl Alcohol and Sodium Acrylate

One hundred and ninety-three grams of the copolymer of vinyl alcohol and sodium acrylate obtained in Production Example 2 was pulverized in a jet mill (LJ, produced by Nippon Pneumatic Mfg. Co., Ltd.) to obtain 173 g of fine powder of the copolymer of vinyl alcohol and sodium acrylate. The particle diameter of the obtained copolymer, as measured using a laser diffraction particle size distribution analyzer (SALD-7100, produced by Shimadzu Corporation), was 46 μm. The viscosity of a 1 mass % aqueous solution of the obtained copolymer was 1650 mPa·s. The copolymerization composition ratio of vinyl alcohol and sodium acrylate was about 6:4 (molar ratio). The viscosity of the 1 mass % aqueous solution was measured using a Brookfield rotational viscometer (model: DV–I+) with a No. 5 spindle rotor at 50 rpm (liquid temperature: 25° C.)

Production of Positive Electrode

Production Example 4-1

Production of NCM (Nickel-Manganese-Cobalt) Positive Electrode

Ninety parts by mass of a positive electrode active material ($LiNi_{0.33}Co_{0.33}Mn_{0.33}O_2$, produced by Toda Kogyo Corp.), 6 parts by mass of the copolymer of vinyl alcohol and sodium acrylate obtained in Production Example 3 as a binder, 2 parts by mass of carbon nanotube (VGCF, produced by Showa Denko K. K.) as a conducting agent, 2 parts by mass of Ketjen black (ECP-300JD, produced by Lion Corporation), and 100 parts by mass of water were mixed to prepare a positive electrode mixture slurry.

The obtained electrode mixture was applied to a 20-μm-thick aluminum foil (produced by Fukuda Metal Foil & Powder Co., Ltd.); immediately after the application, temporary drying was performed at 80° C., followed by a pressing step to tightly adhere the aluminum foil to the coating film. Next, heat treatment was performed (under reduced pressure at 140° C. for 12 hours) to produce a positive electrode. The positive electrode active material layer of the positive electrode had a thickness of 100 lam and a weight of 19 mg/cm².

Production Example 4-2

Production of NCM (Nickel-Manganese-Cobalt) Positive Electrode

Ninety parts by mass of a positive electrode active material ($LiNiCoMnO_2$: produced by Sumitomo Osaka Cement Co., Ltd.), 6 parts by mass of PVDF as a binder, 2 parts by mass of carbon nanotube (VGCF, produced by Showa Denko K. K.) as a conducting agent, 2 parts by mass of Ketjen black (ECP-300JD, produced by Lion Corporation), and 100 parts by mass of water were mixed to prepare a positive electrode mixture slurry.

The obtained electrode mixture was applied to a 20-μm-thick aluminum foil (produced by Fukuda Metal Foil & Powder Co., Ltd.); immediately after the application, temporary drying was performed at 80° C., followed by a pressing step to tightly adhere the aluminum foil to the coating film. Next, heat treatment was performed (under reduced pressure at 140° C. for 12 hours) to produce a positive electrode. The positive electrode active material layer of the positive electrode had a thickness of 100 lam and a weight of 19 mg/cm².

Production of Negative Electrode

Production Example 5

Production of Graphite Negative Electrode

Ninety-three parts by mass of graphite (MAG, produced by Hitachi Chemical Company, Ltd.) as a negative electrode active material, 2 parts by mass of acetylene black (Denka Black, produced by Denki Kagaku Kogyo Kabushiki Kaisha) as a conductive additive, 1 part by mass of vapor-grown carbon fiber (VGCF-H, produced by Showa Denko K. K.), 4 parts by mass of the copolymer of vinyl alcohol and sodium acrylate obtained in Production Example 3 as a binder, and 100 parts by mass of water were mixed to prepare a negative electrode mixture slurry.

The obtained electrode mixture was applied to a 20-µm-thick electrolytic copper foil (produced by Fukuda Metal Foil & Powder Co., Ltd.); immediately after the application, temporary drying was performed at 80° C., followed by a pressing step to tightly adhere the electrolytic copper foil to the coating film. Next, heat treatment was performed (under reduced pressure at 140° C. for 12 hours) to produce a negative electrode. The negative electrode active material layer of the negative electrode had a thickness of 67 µm and a weight of 10 mg/cm$^2$.

Battery Assembly

Example 1

Production of Lithium Ion Secondary Battery

A winding-type lithium ion battery that was of an aluminum-laminated cell type and had a capacity of 1.0 to 1.2 Ah was produced, the battery comprising the positive electrode produced in Production Example 4-1, the negative electrode produced in Production Example 5, a separator (Separion (registered trademark), produced by Evonik) obtained by coating an inorganic oxide (SiO$_2$) on a PET (polyethylene terephthalate) nonwoven fabric, and an electrolyte solution. The electrolyte solution was obtained by dissolving LiPF$_6$ at a concentration of 1 mol/L in a solvent containing a mixture of ethylene carbonate (EC) and diethyl carbonate (DEC) at a volume ratio of 1:1, and further adding 1 part by mass of vinylene carbonate (VC) as an additive for electrolyte solutions (based on 100 parts by mass of the total amount of EC, DEC, and LiPF$_6$).

Examples 2 to 5

Comparative Examples 1 and 2

Lithium ion batteries were produced as in Example 1, except that the separators shown in Table 1 were used in place of Separion (registered trademark). The separators used in Examples 1 to 5 were either obtained by coating an inorganic oxide (an inorganic coating layer) on a polymeric base material (a polymer layer) (Examples 1 to 3 and 5), or obtained by using a polymer having a melting point or a glass transition temperature of 140° C. or higher (Example 4).

Comparative Example 3

A negative electrode was produced as in Production Example 5, except that 2 parts by mass of carboxymethyl cellulose (CMC, #2260, produced by Daicel Corporation) and 2 parts by mass of styrene-butadiene rubber (SBR, TRD2001, produced by JSR) were used as the binder in place of the copolymer of vinyl alcohol and sodium acrylate obtained in Production Example 3. A lithium ion battery was then produced as in Comparative Example 1, except that this negative electrode was used.

Comparative Example 4

A lithium ion battery was produced as in Comparative Example 3, except that a separator (Separion (registered trademark), produced by Evonik) obtained by coating an inorganic oxide (SiO$_2$) on a PET (polyethylene terephthalate) nonwoven fabric was used as the separator.

Comparative Example 5

A negative electrode was produced as in Production Example 5, except that 4 parts by mass of polyvinylidene difluoride (PVDF, #9200, produced by Kureha Corporation) was used as the binder in place of the copolymer of vinyl alcohol and sodium acrylate obtained in Production Example 3. A lithium ion battery was then produced as in Comparative Example 1, except that this negative electrode was used.

Comparative Example 6

A lithium ion battery was produced as in Comparative Example 5, except that a separator (Separion (registered trademark), produced by Evonik) obtained by coating an inorganic oxide (SiO$_2$) on a PET (polyethylene terephthalate) nonwoven fabric was used as the separator.

Example 6

A negative electrode was produced as in Production Example 5, except that the amount of graphite used was changed to 96 parts by mass, and the amount of the copolymer of vinyl alcohol and sodium acrylate obtained in Production Example 3 used was changed to 1 part by mass. A lithium ion battery was produced as in Example 1, except that this negative electrode was used.

Example 7

A negative electrode was produced as in Production Example 5, except that the amount of graphite used was changed to 85 parts by mass, and the amount of the copolymer of vinyl alcohol and sodium acrylate obtained in Production Example 3 used was changed to 12 parts by mass. A lithium ion battery was produced as in Example 1, except that this negative electrode was used.

Example 8

A negative electrode was produced as in Production Example 5, except that the temporary drying temperature for the electrode was changed to 100° C. A lithium ion battery was produced as in Example 1, except that this negative electrode was used.

Example 9

A negative electrode was produced as in Production Example 5, except that the temporary drying temperature for the electrode was changed to 45° C. A lithium ion battery was produced as in Example 1, except that the obtained negative electrode was used.

Example 10

A lithium ion battery was produced as in Example 1, except that the positive electrode produced in Production Example 4-2 was used in place of the positive electrode produced in Production Example 4-1.

Safety Evaluation (Nail Penetration Test)

Before safety evaluation, the batteries obtained in Examples 1 to 10 and Comparative Example 1 to 6 were subjected to aging treatment under the following conditions. The measurement was performed using NR600 (produced by Keyence Corporation, CSV files, data collection rate: 0.01 ms, 0.1 ms).

Measurement conditions: 0.1 C-0.1 C (charge-discharge)
  CC-CC Cutoff potential: 2.5 to 4.2 V
*Five charge-discharge cycles were performed in a 30° C. environment, and completed at a charge of 100%.

For safety evaluation, the batteries after aging treatment were subjected to a nail penetration test in which a battery is forced to be internally short-circuited. A round iron nail (length: 65 mm, φ 3 mm, having a built-in thermometer) was thrust into the center of the battery at a descending rate of 1 mm/second, and penetrated in an explosion-proof thermostat bath at 25° C. in atmospheric air. The operations of thrusting and penetration were performed by first immobilizing the nail for 5 seconds on a sample battery, then allowing the nail to penetrate into the battery, and maintaining it for 10 minutes after penetration into the battery. When an internal short circuit occurs, a short-circuit current could possibly flow into the short circuit part, generating Joule heat, which could possibly cause a battery thermal runaway. According to the nail penetration test, the short circuit state can be presumed based on changes in battery voltage at the time of nail penetration; based on changes in the cell internal temperature, the short circuit state can be presumed while the heat stability inside the battery can be evaluated. Batteries that show a small voltage change and have a low maximum temperature have more excellent safety and cause less abnormal heat generation when short-circuited.

Tables 1 to 4 below show the maximum internal temperature (° C.) of the battery at the time of the nail penetration test, and the voltage (V) 10 minutes after the nail penetration. In Tables 1 to 4, the voltage (V) before the nail penetration is shown on the left side, while the voltage (V) 10 minutes after the nail penetration is shown on the right side. Batteries that had a maximum internal temperature of 400° C. or higher and resulted in a dead short (0V) were evaluated as C; batteries that had a maximum internal temperature of 300° C. or higher but achieved a voltage change of within ±1.0 V were evaluated as B; and batteries that had a maximum internal temperature of 300° C. or lower and achieved a voltage change of within ±1.0 V were evaluated as A (Tables 1 to 5). In the tables, PE refers to polyethylene, PP refers to polypropylene, and PE/PP refers to an ethylene-propylene copolymer.

TABLE 1

NCM (PVDF)/Graphite (the copolymer of vinyl alcohol and sodium acrylate, Production Example 3)
Evaluation According to Different Separators

|  | Separator | | | Maximum internal temperature (° C.) | Voltage (V) | Voltage (V) | Evaluation |
|---|---|---|---|---|---|---|---|
|  | Polymer layer | Inorganic coating layer | Product name/company | | | | |
| Ex. 1 | PET nonwoven fabric | $SiO_2$ | Separion/Evonik | 280 | 4.0 | 3.5 | A |
| Ex. 2 | Olefin nonwoven fabric | $Al_2O_3$ | Mitsubishi Paper Mills Limited. | 268 | 4.0 | 3.5 | A |
| Ex. 3 | Olefin nonwoven fabric | $SiO_2$ | Mitsubishi Paper Mills Limited. | 260 | 3.8 | 3.4 | A |
| Ex. 4 | Aramid microporous membrane | — | Teijin Limited. | 227 | 4.2 | 3.4 | A |
| Ex. 5 | Aramid nonwoven fabric | $SiO_2$ | Teijin Limited. | 268 | 3.9 | 3.4 | A |
| Comp. Ex. 1 | PE microporous membrane | — | Hipore/Asahi Kasei E-materials Corp. | 446 | 4.2 | 0 | C |
| Comp. Ex. 2 | Laminate of PE and PP microporous membranes* | — | Asahi Kasei E-materials Corp. | 457 | 4.2 | 0 | C |

*refers to a laminate of PE and PP microporous membranes, rather than an ethylene-propylene copolymer (PE/PP).

TABLE 2

NCM (PVDF)/Graphite (PVDF or CMC/SBR)
Evaluation According to Different Binders and Separators

|  | Separator | | | | Maximum internal temperature (° C.) | Voltage (V) | Voltage (V) | Evaluation |
|---|---|---|---|---|---|---|---|---|
|  | Binder for negative electrodes | Polymer layer | Inorganic coating layer | Product name/company | | | | |
| Comp. Ex. 3 | CMC/SBR | PE microporous membrane | — | Hipore/Asahi Kasei E-materials Corp. | 430 | 4.2 | 0 | C |
| Comp. Ex. 4 | CMC/SBR | PET nonwoven fabric | $SiO_2$ | Separion/Evonik | 455 | 3.9 | 0 | C |
| Comp. Ex. 5 | PVDF | PE microporous membrane | — | Hipore/Asahi Kasei E-materials Corp. | 500 | 4.1 | 0 | C |
| Comp. Ex. 6 | PVDF | PET nonwoven fabric | $SiO_2$ | Separion/Evonik | 430 | 4.1 | 0 | C |

TABLE 3

NCM (PVDF)/Graphite (the copolymer of vinyl alcohol and sodium acrylate, Production Example 3)
Evaluation According to Different Amounts of Binders and Different Drying Temperatures

| | Negative electrode composition (parts by mass) | | | Electrode temporary drying temperature (° C.) | Maximum internal temperature (° C.) | Voltage (V) | Voltage (V) | Evaluation |
|---|---|---|---|---|---|---|---|---|
| | Graphite | Conductive additive | Binder | | | | | |
| Ex. 6 | 96 | 3 | 1 | 80 | 280 | 4.0 | 3.5 | A |
| Ex. 7 | 85 | 3 | 12 | 80 | 268 | 4.1 | 3.5 | A |
| Ex. 8 | 93 | 3 | 4 | 100 | 260 | 3.9 | 3.4 | A |
| Ex. 9 | 93 | 3 | 4 | 45 | 330 | 3.5 | 2.5 | B |

TABLE 4

| | Separator | | Product name/company | Maximum internal temperature (° C.) | Voltage (V) | Voltage (V) | Evaluation |
|---|---|---|---|---|---|---|---|
| | Polymer layer | Inorganic coating layer | | | | | |
| Ex. 10 | PET nonwoven fabric | SiO$_2$ | Separion/Evonik | 280 | 4.1 | 3.5 | A |

According to Table 1 and Table 2, the batteries of Comparative Examples 1, 2, 3, and 5 obtained by using a PE microporous membrane or a PE/PP microporous membrane, which are used as general-purpose separators, resulted in a dead short regardless of the types of binder, and the internal temperature increased to about 500° C. Further, the batteries of Comparative Examples 4 and 6 obtained by using PVDF or CMC/SBR as the binder and the separator having an inorganic coating resulted in a dead short. In contrast, the batteries of Examples 1 to 5 obtained by using a specific separator (the separator having an inorganic coating or the separator comprising a polymer having a melting point or a glass transition temperature of 140° C. or higher), and the copolymer of vinyl alcohol and sodium acrylate as the binder achieved a small voltage change and a low maximum temperature, showing more excellent battery safety.

According to Table 3, the results of Examples 6 and 7 revealed that the copolymer of vinyl alcohol and sodium acrylate as a binder was effective even in an amount range of, at the very least, 1 part by mass or more and 12 parts by mass or less, to inhibit thermal runaway. The results of Examples 8 and 9 suggested that a higher temporary drying temperature for electrode was more preferable.

Table 4 demonstrated that the use of the copolymer of vinyl alcohol and sodium acrylate as the binder of the negative electrode achieved a small voltage change, a low maximum temperature, and more excellent battery safety, even with the use of a conventional binder (PVDF) as the binder of the positive electrode.

Concentration Distribution of Binder

The evaluation of the concentration distribution of binder was performed using a field emission electron probe microanalyzer (FE-EPMA). As is clear from the disclosure in the following Examples 11 and 12 and Comparative Examples 9 and 10, in this evaluation, a copolymer of vinyl alcohol and an alkali metal neutralized product of ethylenically unsaturated carboxylic acid, CMC/SBR, or PVDF was used as the binder. The SBR-based adhesive was stained with Os. CP processing was performed to produce a cross section of each electrode, and the distribution state of each element (the copolymer: Na; CMC/SBR: Os; and PVDF: F (fluorine)) in the electrode cross section of each sample was observed based on elemental color mapping using a JXA-8500F (produced by JEOL Ltd.). To express the concentration distribution in a numerical form, the amount of binder in specific areas was calculated taking the amount of binder distributed over the electrode as 100 mass %. Table 5 shows the amount of binder present in each region, i.e., a lower layer and an upper layer, wherein the lower layer represents the region from the current collector to T/2 while the upper layer represents the region from the active material layer surface to T/2, wherein T represents a distance from the surface of the current collector to the surface of the active material layer.

For the negative electrode produced in Example 8, the concentration distribution of binder was analyzed in a similar manner. The results confirmed that the binder rate (mass %) of the upper layer and the lower layer was 55:45.

Electrode Peel Test

To evaluate the peeling strength of the electrode, an adhesive tape (according to JIS Z 6050) was adhered to the surface of the negative electrode produced in Production Example 5, and a 180° peel test (according to JIS K 6854-2) was performed to evaluate the peeling strength between the electrolytic copper foil and the negative electrode active material layer.

Example 11

The negative electrode produced in Production Example 5 was subjected to FE-EPMA measurement and the peel test. Table 5 shows the results.

Example 12

A negative electrode was produced as in Production Example 5, except that the temporary drying temperature of the electrode was changed to 45° C. The FE-EPMA measurement and peel test were performed as in Example 11, except that the obtained negative electrode was used. Table 5 shows the results.

Comparative Example 9

A negative electrode was produced as in Production Example 5, except that 2 parts by mass of carboxymethyl cellulose (CMC, #2260, produced by Daicel Corporation) and 2 parts by mass of styrene-butadiene rubber (SBR, TRD2001, produced by JSR) were used as the binder in place of the copolymer of vinyl alcohol and sodium acrylate obtained in Production Example 3. The FE-EPMA measurement and peel test were performed as in Example 11, except that the obtained negative electrode was used. Table 5 shows the results.

Comparative Example 10

A negative electrode was produced as in Production Example 5, except that 4 parts by mass of polyvinylidene difluoride (PVDF, #9200, produced by Kureha Corporation) was used as the binder in place of the copolymer of vinyl alcohol and sodium acrylate obtained in Production Example 3. The FE-EPMA measurement and peel test were performed as in Example 11, except that the obtained negative electrode was used. Table 5 shows the results.

TABLE 5

|  | Range | Binder rate (mass %) | Peel strength (N) of electrode | Evaluation |
|---|---|---|---|---|
| Ex. 11 | Upper layer | 61 | 2.8 | A |
|  | Lower layer | 39 |  |  |
| Ex. 12 | Upper layer | 54 | 3.5 | B |
|  | Lower layer | 46 |  |  |
| Comp. Ex. 9 | Upper layer | 74 | 1.3 | C |
|  | Lower layer | 26 |  |  |
| Comp. Ex. 10 | Upper layer | 47 | 0.8 | C |
|  | Lower layer | 53 |  |  |

Table 5 revealed that the distribution of the binder (the copolymer of vinyl alcohol and sodium acrylate, CMC/SBR, or PVDF) in the electrode could be suitably set by adjusting the type of binder and the temporary drying temperature.

Further, Table 5 revealed that the copolymer of vinyl alcohol and sodium acrylate achieved a higher peeling strength of the electrode, compared with CMC/SBR or PVDF. Examples 11 and 12 achieved a sufficient peeling strength; however, the peeling strength was considered to be insufficient in Comparative Examples 9 and 10.

The invention claimed is:

1. A lithium ion secondary battery comprising
a positive electrode having a positive electrode active material layer on a current collector,
a negative electrode having a negative electrode active material layer on a current collector, and
a separator disposed between the positive electrode and the negative electrode and impregnated with a non-aqueous electrolyte solution,
the positive electrode active material layer comprising a positive electrode active material and a binder of the positive electrode active material layer,
the negative electrode active material layer comprising a negative electrode active material and a binder of the negative electrode active material layer,
the binder of the negative electrode active material layer comprising a copolymer of vinyl alcohol and an alkali metal neutralized product of ethylenically unsaturated carboxylic acid,
the separator comprising a polymeric base material containing an inorganic compound or comprising a polymer having a melting point of 140° C. or higher or a glass transition temperature of 140° C. or higher, and
wherein when the thickness of the negative electrode active material layer is defined as T μm, the amount of binder present in a region with a thickness of T/2 μm from the current collector side is 25 to 46 mass %, and the amount of binder present in a region with a thickness of T/2 μm from the negative electrode active material layer surface side is 54 to 75 mass %, based on the total amount (100 mass %) of the binder contained in the negative electrode active material layer.

2. The lithium ion secondary battery according to claim 1, wherein the non-aqueous electrolyte solution comprises vinylene carbonate.

3. The lithium ion secondary battery according to claim 1, wherein the polymeric base material is in the form of a microporous membrane or a nonwoven fabric.

4. The lithium ion secondary battery according to claim 1, wherein the polymeric base material is a base material of at least one polymer selected from the group consisting of polyethylene, polypropylene, polyamide, polyamideimide, polyimide, polyethylene terephthalate, and ethylene-propylene copolymers.

5. The lithium ion secondary battery according to claim 1, wherein the inorganic compound is at least one member selected from the group consisting of alumina, silica, zinc oxide, titanium oxide, aluminum nitride, silicon nitride, titanium nitride, boron nitride, aluminum sulfate, calcium sulfate, talc, bentonite, zeolite, kaolin, mica, montmorillonite, and glass.

6. The lithium ion secondary battery according to claim 1, wherein the binder of the positive electrode active material layer comprises a copolymer of vinyl alcohol and an alkali metal neutralized product of ethylenically unsaturated carboxylic acid.

7. The lithium ion secondary battery according to claim 1, wherein the positive electrode active material layer comprises a conductive additive and has a binder content of 0.5 to 30 mass % and a conductive additive content of 0.1 to 30 mass %, based on the total amount (100 mass %) of the positive electrode active material, the binder, and the conductive additive contained in the positive electrode active material layer.

8. The lithium ion secondary battery according to claim 1, wherein the negative electrode active material layer has a thickness of 20 to 300 μm.

9. The lithium ion secondary battery according to claim 1, wherein the binder of the negative electrode active material layer has a binder concentration gradient such that the concentration in the cross-section of the negative electrode active material layer increases toward the active material layer surface from the current collector side.

10. The lithium ion secondary battery according to claim 1, wherein the negative electrode active material layer comprises a conductive additive and has a binder content of 0.5 to 15 mass % and a conductive additive content of 5 mass % or less, based on the total amount (100 mass %) of the negative electrode active material, the binder, and the conductive additive contained in the negative electrode active material layer.

11. The lithium ion secondary battery according to claim 1, wherein the alkali metal neutralized product of ethylenically unsaturated carboxylic acid in the binder of the negative electrode active material layer is at least one alkali metal neutralized product of ethylenically unsaturated carboxylic acid selected from the group consisting of alkali metal neutralized products of acrylic acid and alkali metal neutralized products of methacrylic acid.

12. An electronic device comprising the lithium ion secondary battery according to claim 1.

* * * * *